US008869385B2

(12) United States Patent  
Chang et al.

(10) Patent No.: US 8,869,385 B2  
(45) Date of Patent: Oct. 28, 2014

(54) APPARATUS FOR POSITIONING COMPONENTS IN HDD

(75) Inventors: Jen-Yuan Chang, San Jose, CA (US); Khaled M. Fawzi, San Jose, CA (US); Russell D. Moates, San Jose, CA (US); Edgar D. Rothenberg, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 1938 days.

(21) Appl. No.: 11/903,771

(22) Filed: Sep. 24, 2007

(65) Prior Publication Data

US 2009/0080113 A1    Mar. 26, 2009

(51) Int. Cl.
*B23P 19/00* (2006.01)

(52) U.S. Cl.
USPC .............. 29/740; 29/603.03; 29/709; 29/759; 360/244.1

(58) Field of Classification Search
USPC ............ 29/603.03, 603.04, 603.06, 832, 833, 29/709, 720, 737, 739, 759, 740; 360/244.1, 255.8, 255.9, 264.2
See application file for complete search history.

(56) References Cited

U.S. PATENT DOCUMENTS

| | | | |
|---|---|---|---|
| 4,509,251 A * | 4/1985 | Gyi et al. | 29/603.06 |
| 4,862,584 A | 9/1989 | Budy et al. | |
| 5,644,452 A * | 7/1997 | Cox et al. | 360/264.2 |
| 5,734,523 A | 3/1998 | Scheidecker et al. | |
| 6,185,076 B1 | 2/2001 | Shinbo et al. | |
| 6,266,869 B1 | 7/2001 | Tracy et al. | |
| 6,397,455 B1 | 6/2002 | Hagen | |
| 6,466,257 B1 | 10/2002 | Baugh et al. | |
| 6,481,093 B1 * | 11/2002 | Ruden et al. | 29/603.03 |
| 6,779,252 B2 | 8/2004 | Tracy et al. | |
| 6,812,429 B2 | 11/2004 | Shang | |
| 2002/0069510 A1 | 6/2002 | Girard et al. | |
| 2002/0175695 A1 | 11/2002 | Ahmann et al. | |
| 2006/0039087 A1 | 2/2006 | Ho et al. | |
| 2006/0168796 A1 | 8/2006 | Zhang et al. | |

FOREIGN PATENT DOCUMENTS

EP       0354679       2/1990

OTHER PUBLICATIONS

Singh, et al., "Laser Processing to Adjust the Suspension Preload of Magnetic Recording Head Stack Assemblies", *IEEE Transactions on Magnetics*, vol. 36, No. 5, (Sep. 2000),2724-2726.
Ritthidetch, et al., "Improving Suspension Manufacturing Yield Using Polynomial Regression", *IEEE Magazine*, (2004),1889-1894.

* cited by examiner

*Primary Examiner* — Donghai D. Nguyen

(57) ABSTRACT

An apparatus for positioning a component relative to an associated component. The apparatus includes a component receiver and onto which the component is disposed. The apparatus also includes an associated component receiver and onto which the associated component is disposed. The component receiver orients the component into a position for retaining the component to the associated component. The apparatus further includes a retention device driver for inserting a retention device, the retention device retaining the component to the associated component in the position. The apparatus also includes an optical position verifier for verifying the position of the component and the associated component.

7 Claims, 9 Drawing Sheets

APPARATUS FOR POSITIONING COMPONENTS IN HDD

TECHNICAL FIELD

The invention relates to the field of hard disk drives.

BACKGROUND ART

Direct access storage devices (DASD) have become part of everyday life, and as such, expectations and demands continually increase for greater speed for manipulating and for holding larger amounts of data. To meet these demands for increased performance, the mechano-electrical assembly in a DASD device, specifically the Hard Disk Drive (HDD) has evolved to meet these demands.

Advances in magnetic recording heads as well as the disk media have allowed more data to be stored on a disk's recording surface. The ability of an HDD to access this data quickly is largely a function of the performance of the mechanical components of the HDD. Once this data is accessed, the ability of an HDD to read and write this data quickly is primarily a function of the electrical components of the HDD.

A computer storage system may include a magnetic hard disk(s) or drive(s) within an outer housing or base containing a spindle motor assembly having a central drive hub that rotates the disk. An actuator includes a plurality of parallel actuator arms in the form of a comb that is movably or pivotally mounted to the base about a pivot assembly. A controller is also mounted to the base for selectively moving the comb of arms relative to the disk.

Each actuator arm has extending from it at least one cantilevered electrical lead suspension. A magnetic read/write transducer or head is mounted on a slider and secured to a flexure that is flexibly mounted to each suspension. The read/write heads magnetically read data from and/or magnetically write data to the disk. The level of integration called the head gimbal assembly (HGA) is the head and the slider, which are mounted on the suspension. The slider is usually bonded to the end of the suspension.

A suspension has a spring-like quality, which biases or presses the air-bearing surface of the slider against the disk to cause the slider to fly at a precise distance from the disk. Movement of the actuator by the controller causes the head gimbal assemblies to move along radial arcs across tracks on the disk until the heads settle on their set target tracks. The head gimbal assemblies operate in and move in unison with one another or use multiple independent actuators wherein the arms can move independently of one another.

During processes for assembly of the hard disk drive, and prior to mounting of the read/write heads, flexure, etc., to each actuator arm in the actuator comb, each integrated lead solder pad on each of the parallel arms of the actuator comb is connected to an associated integrated lead solder pad on a flex cable. A flex cable commonly includes an actuator electronic (AE) bracket that intercouples the read/write head with controlling electronics of the hard disk drive. The soldering junctions, when subjected to a solder reflow process, provide an electrical and communicative connection between components subsequently mounted on the actuator comb and components, devices and controllers of the hard disk drive.

Further within the assembly process, and prior to the solder reflow process performed on the solder pads of the actuator comb and the flex cable, there is a process of mounting the flex cable onto the actuator comb. A mounting process attaches the flex cable to the actuator comb while aligning the solder pads of the actuator comb with the solder pads of the flex cable.

SUMMARY OF THE INVENTION

A system and method for verifying positional orientation in a component to component mounting process is described.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of the invention that provide vision guided positioning of a flex cable and an actuator comb in an embodiment of the present invention.

Although embodiments of the present invention will be described in conjunction with flex cable/actuator comb positioning in HDD assembly, it is understood that the embodiments described herein are useful outside of the art of hard disk drives, such as devices that require micro solder pad alignment. The positioning and mounting of a flex cable and actuator comb is one example of embodiments of the present invention and is provided herein merely for purposes of brevity and clarity.

Overview

Figure 1:
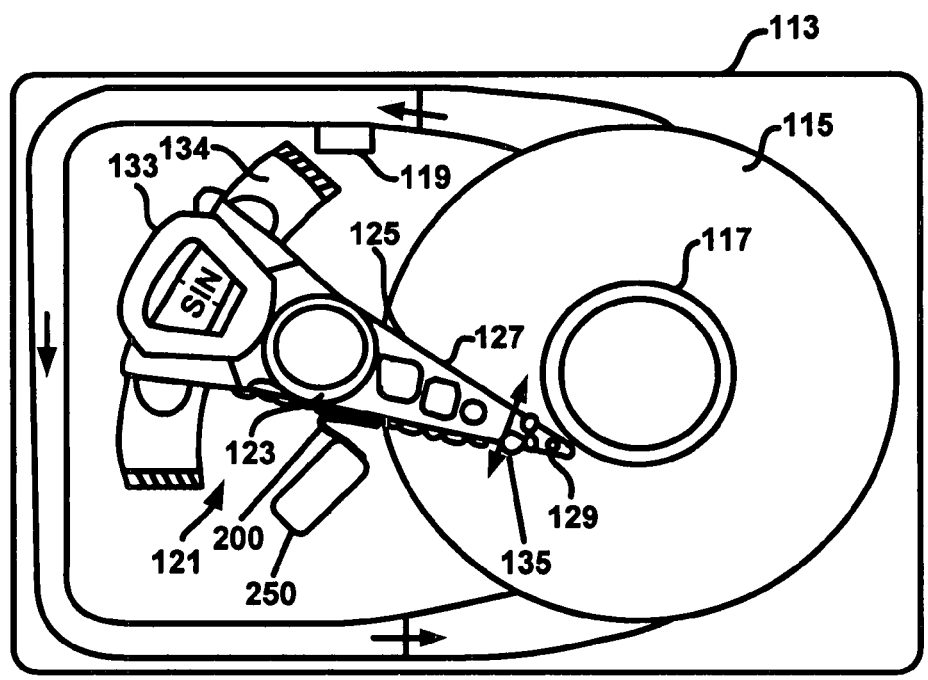
FIG. 1 is plan view of a hard disk drive (HDD) upon which embodiments of the present invention may be practiced.

With reference now to FIG. 1, a schematic drawing of an embodiment of an information storage system comprising a magnetic hard disk file or drive 199 for a computer system is shown. Drive 199 has an outer housing or base 113 containing a disk pack having at least one media or magnetic disk 115. Although not shown in FIG. 1, it is noted that there is an appropriately configured (mated) cover for disposition upon outer housing 113, such that when the cover is in place, a sealed HDD exists. A spindle motor assembly having a central drive hub 117 rotates the disk or disks 115. An actuator 121 comprises a plurality of parallel actuator arms (one shown) in the form of an actuator comb assembly 125 that is movably or pivotally mounted to base 113 about a pivot assembly 123. A controller 119 is also mounted to base 113 for selectively moving actuator comb assembly 125 relative to disk 115.

In the embodiment shown, each parallel arm of actuator comb assembly 125 has extending from it at least one cantilevered electrical lead suspension (ELS) 127. The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension (also referred to as a flexure) 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and move in unison with one another, unless drive 199 uses multiple independent actuators (not shown) wherein the arms can move independently of one another.

Also shown in FIG. 1 is a flex cable 200, having coupled therewith an actuator electronics (AE) bracket 250, that is attached to actuator comb assembly 125 in accordance with embodiments of the present invention. It is with reference to attaching a flex cable to an actuator comb assembly during assembly of hard disk drive 199 that embodiments of the present invention are directed.

Figure 2A:
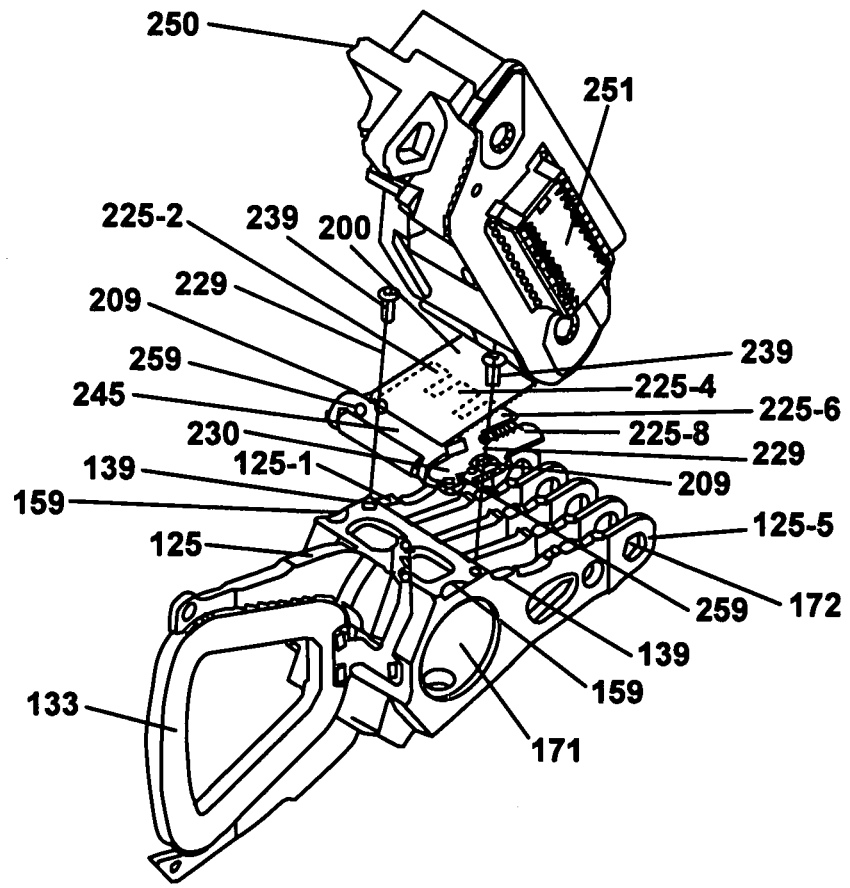
FIG. 2A is a bottom angled illustrated view of an actuator comb assembly and a flex cable in an embodiment of the present invention, in an embodiment of the present invention.

FIG. 2A is an expanded view of a flex cable 200 prior to be mounted upon an actuator comb assembly 125 in an embodiment of the present invention. In an alternative embodiment, the mounting process performed in accordance with embodiments of the present invention may be reversed, such that assembly 125 is mounted upon flex cable 200.

Flex cable 200 is shown to have coupled therewith an actuator electronics bracket, e.g., AE bracket 250. AE bracket 250 is shown to include an electrical connector, e.g., connector 251. In an embodiment of the present invention, connector 251 is a P2 connector. P2 connector 251 provides further electrical and communicative linking of the components disposed at the distal end of each parallel arm of actuator comb assembly 125 and devices, components and controllers within drive 199.

Figure 6:
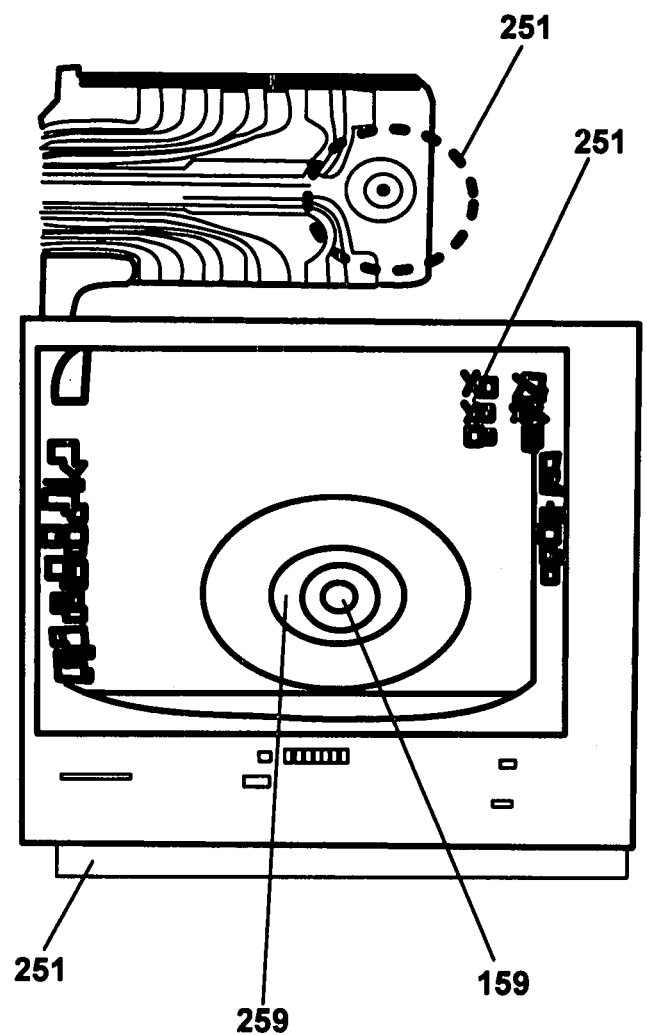
FIG. 6 is an illustration of positional orientation in accordance with an embodiment of the present invention.

Flex cable 200 further includes a bend support 245 for preventing creasing of flex cable 200. In an embodiment of the present invention, support 245 is configured in a 'J' shape, and which when combined with the flex cable is collectively referred to as an integrated j flex cable 200. Extending from flex cable 200 is a substrate 230. Substrate 230 includes a plurality of substrate tines 225. Each tine, e.g., tine 225-2, 225-4, 225-6 and 225-8 has disposed thereon one or more collections (banks) of integrated lead solder pads. The banks of integrated lead solder pads on substrate 230 tines are configured to align with integrated lead solder pads on each parallel arm present in actuator comb assembly 125 subsequent to mounting flex cable 200 to actuator comb assembly 125, as shown in FIG. 6.

The number of substrate tines 225, and related solder pads, which may be present in flex cable 200 is/are directly related to the number of parallel arms, and related solder pads, present in actuator comb assembly 125. As such, quantities of tines, solder pads and parallel arms illustrated herein are exemplary in nature and not to be construed as a limitation.

Substrate 230 of flex cable 200 of FIG. 2A is shown to further include a pair of openings, e.g., openings 209, in an embodiment of the present invention. Each opening 209 is configured to have partially inserted there through a fastening device 239, in an embodiment of the present invention and as indicated by lines 229. In an embodiment of the present invention, fastening device 239 is a screw. Alternatively, fastening device 239 may be nearly any other fastening device that can provide retention of flex cable 200 to actuator comb assembly 125. Each fastener 239 is configured to be inserted into an opening 139 disposed within actuator comb assembly 125. Opening 139 is configured to receive a rotationally inserted fastener 239, in accordance with an embodiment of the present invention. In the present invention, openings 229 of flex cable 200 are configured to align with openings 139 of comb assembly 125. In accordance with embodiments of the present invention, an automated system, e.g., system 500 of FIG. 5, may perform the installation of fasteners 239 into openings 139 of actuator comb assembly 125, thus mounting flex cable 200 to assembly 125.

Substrate 230 of flex cable 200 also includes another pair of openings, e.g., position openings 259, in an embodiment of the present invention. Each position opening 259 is configured to be aligned with an associated position indicator 159 that is disposed on actuator comb assembly 125. In an embodiment of the present invention, an automated system, e.g., system 500 of FIG. 5, may be implemented to verify the alignment of position openings 259 relative to position indicators 159.

Figure 4:
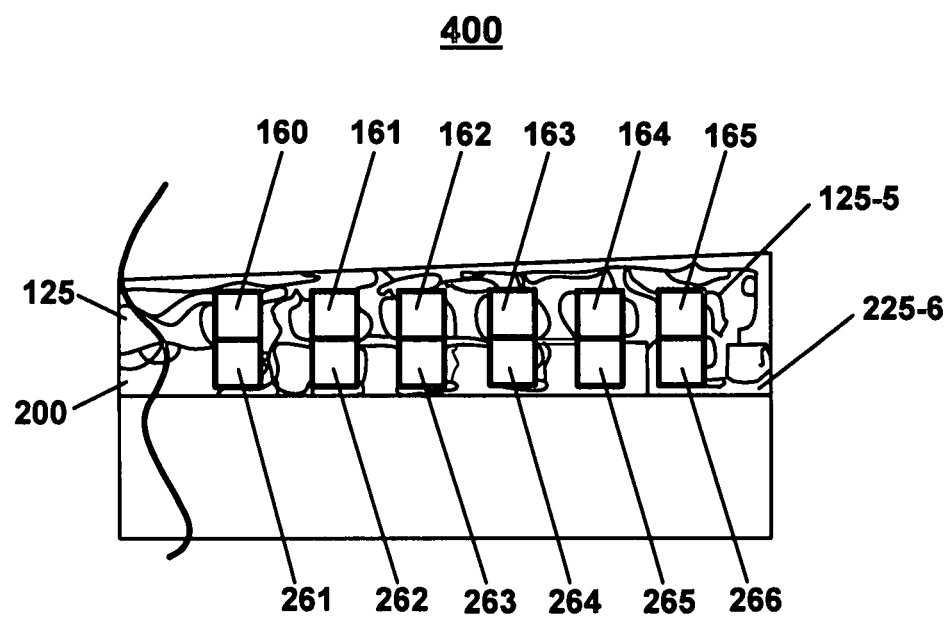
FIG. 4 is an illustrated and block diagram view of the orientation of a bank of integrated lead solder pads of an actuator comb assembly relative to an associated bank of integrated lead solder pads of a flex cable of FIG. 3, in accordance with an embodiment of the present invention.

Still referring to FIG. 2, actuator comb assembly 125 includes a plurality of parallel arms 125-1, 125-3, 125-5, 125-7 and 125-9. Each parallel arm has disposed thereon one or more banks of integrated lead solder pads, as shown in FIG. 4. Actuator comb assembly 125 also includes a plurality of openings, e.g., openings 139, disposed there within and in which each opening 139 is configured to have rotationally inserted therein a fastening device, e.g., fastener 239, in an embodiment of the present invention.

Actuator comb assembly 125 also includes a plurality of position indicators 159 that are disposed on or within the structure of actuator comb assembly 125 in an embodiment of the present invention. Each positional indicator 159 is configured to align with an associated positional opening 259 of flex cable 200 in an embodiment of the present invention. The alignment of positional opening 259 and positional indicator 159 is utilized to verify the position of the flex cable 200 relative to actuator comb assembly 125 prior to and subsequent to the insertion of fasteners 239 into openings 139 in an embodiment of the present invention. In an embodiment of the present invention, an automated system, e.g., system 500 of FIG. 5, may utilize the alignment of positional openings 259 relative to positional indicators 159 to verify alignment prior to and subsequent to the insertion of screws 239 into openings 139 of actuator comb assembly 125.

Figure 5:
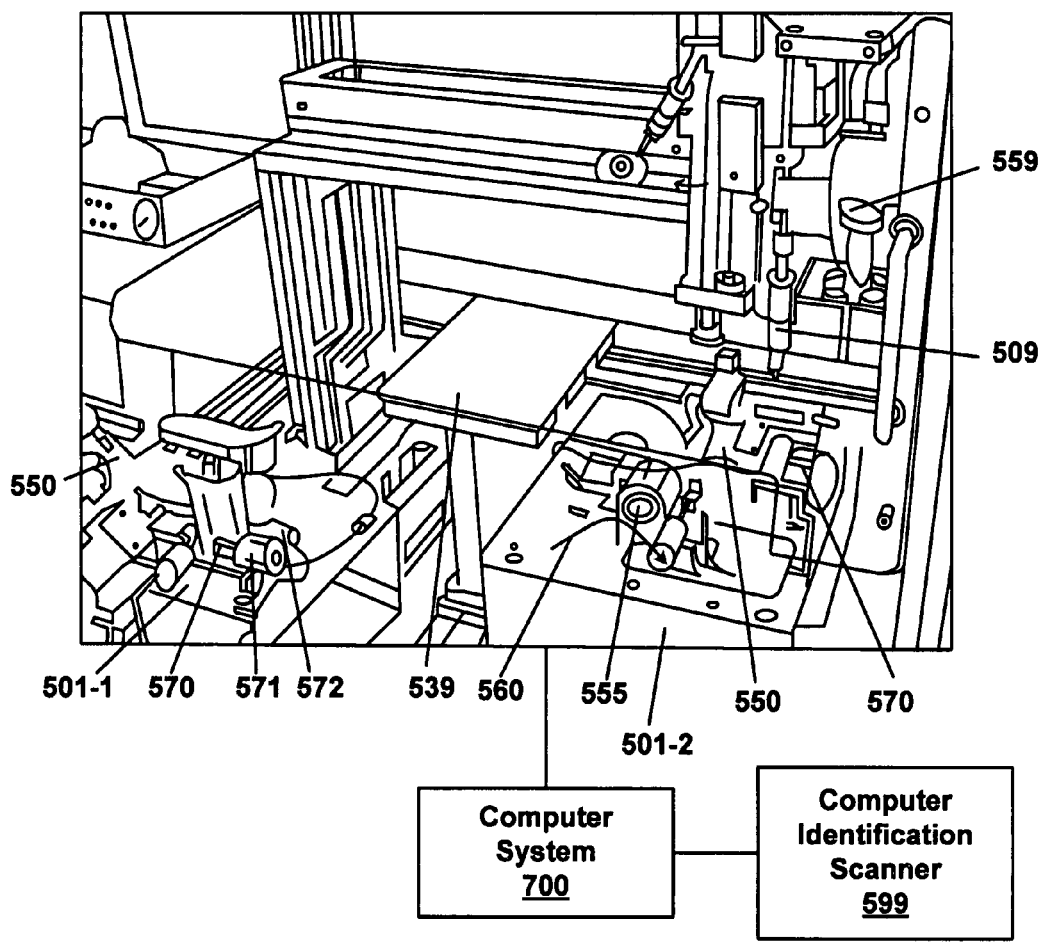
FIG. 5 is a vision guided system for positioning a flex cable and actuator comb in accordance with an embodiment of the present invention.

Actuator comb assembly 125 further includes a plurality of openings, e.g., openings 171 and 172 that are configured to slide over a plurality of shafts, e.g., shafts 571 and 572, respectively, of system 500 of FIG. 5, in an embodiment of the present invention. Embodiments of the present invention provide utilization of existing architecture within the actuator comb assembly 125 for static retention of an actuator comb assembly in a flex cable/actuator comb assembly mounting process.

Figure 2B:
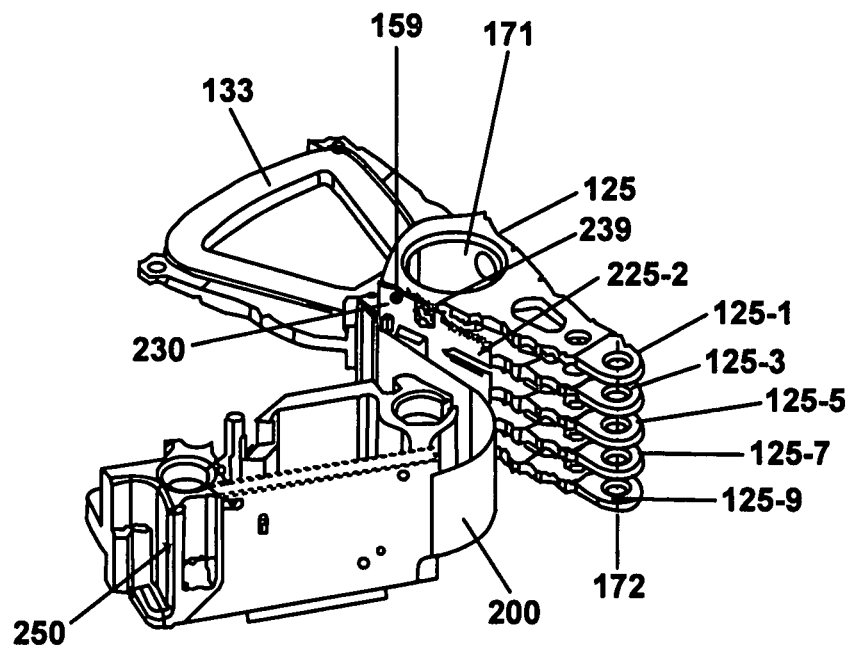
FIG. 2B is an angled illustrated view of the actuator comb assembly and flex cable of FIG. 2A, in accordance with an embodiment of the present invention.

FIG. 2B is an expanded mounted view of the flex cable 200 and actuator comb assembly 125 of FIG. 2A, in an embodiment of the present invention. FIG. 2B shows flex cable 200 with AE bracket 250 coupled therewith having fasteners 239 partially inserted through openings 209 of substrate 230 of flex cable 200 and inserted into openings 139 of actuator comb assembly 125 in accordance with an embodiment of the present invention. FIG. 2B also shows positional opening 259 of flex cable 200 aligned with positional indicator 159 of actuator comb assembly 125 in an embodiment of the present invention. It is noted that the mounting of the flex cable to the actuator comb assembly and the subsequent inserting of a fastening device 239 may be performed by an automated system, e.g., system 500 of FIG. 5, in an embodiment of the present invention.

FIG. 2B also illustrates the orientation of substrate 300 tines relative to each parallel arm in actuator comb assembly. Tine 225-2 of substrate 230 of flex cable 200 is shown proximal to parallel arms 125-1 and 125-3 of actuator comb assembly 125, tine 225-4 is proximal to parallel arms 125-3 and 125-5, and so on, in an embodiment of the present invention. An exploded view of the aligned banks of integrated lead solder pads of the flex cable and the actuator comb assembly are shown in FIG. 4.

Openings 171 and 172 are also shown and are analogous to openings 171 and 172 of FIG. 2A.

Figure 3:
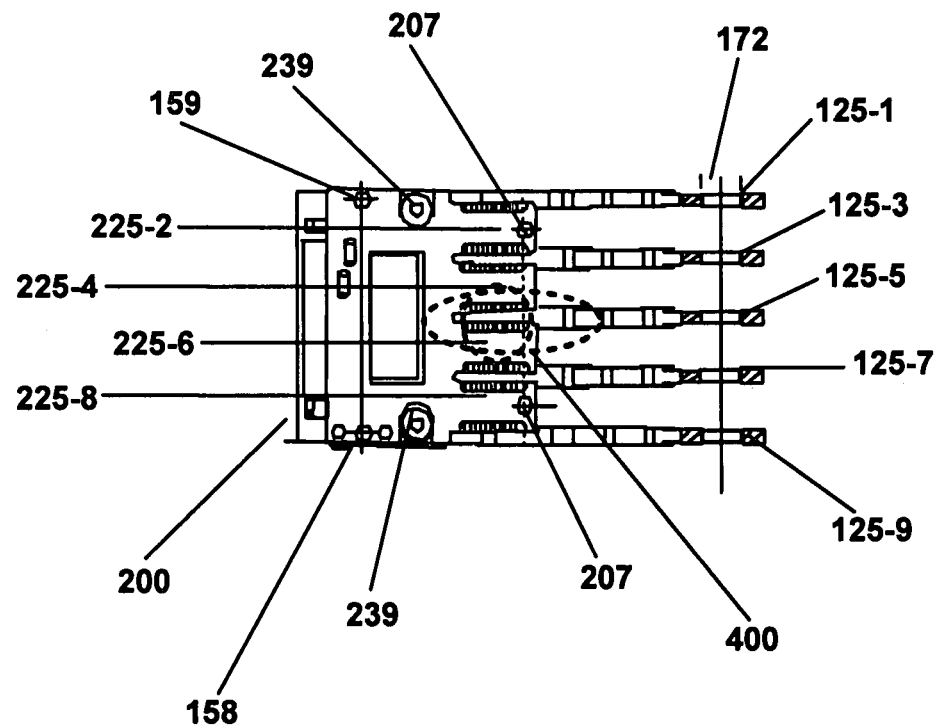
FIG. 3 is a profile illustrated view of the actuator comb assembly and the flex cable of FIG. 1 and FIGS. 2A-2B, in accordance with an embodiment of the present invention.

FIG. 3 is a profile view of the substrate 230 of flex cable 200 and the actuator comb assembly 125 of FIG. 2B subsequent to a mounting process being performed thereon in accordance with an embodiment of the present invention. Substrate 230 includes substrate tines 225-2, 225-4, 225-6 and 225-8 and actuator comb assembly 125 includes parallel arms 125-1, 125-3, 125-5, 125-7 and 125-9. In an embodiment of the present invention, the banks of integrated lead solder pads on the tines are aligned with the integrated lead solder pads on the parallel actuator arms of the actuator comb assembly.

FIG. 3 further includes a region 400 that includes an exampled bank of integrated lead solder pads of a parallel arm of actuator comb assembly 125, e.g., parallel arm 125-5, and a bank of integrated lead solder pads of a tine of substrate 230 of flex cable 200, e.g., tine 225-6, in an embodiment of the present invention. Region 400 is shown and described in detail with reference to FIG. 4.

FIG. 4 is an exploded view of region 400 of FIG. 3. Region 400 is shown to include a parallel arm 125-5 having a bank of integrated lead solder pads, e.g., solder pads 161-166. Region 400 also includes a tine 225-6 having an associated bank of integrated lead solder pads 261-266, such that solder pad 261 is associated with solder pad 161, solder pad 262 is associated with solder pad 162, and so on, in an embodiment of the present invention.

Embodiments of the present invention provide for verifying the proper alignment of the solder pads subsequent to a mounting process performed on flex cable 200 and actuator comb assembly 125. Embodiments of the present invention further provide for detecting improper alignment of the solder pads. In the present embodiment, region 400 depicts proper alignment of the related solder pads.

FIG. 5 is a diagram of a system, e.g., system 500, for performing a component to component mounting process and performing positional alignment verification on the mounted components, in accordance with embodiments of the present invention. In an embodiment of the present invention, system 500 provides mounting a flex cable, e.g., flex cable 200 of FIGS. 1, 2A-2B, 3 and 4, to an actuator comb assembly, e.g., actuator comb assembly 125 of FIGS. 1, 2A-2B, 3 and 4. System 500 further provides for optically verifying positional orientation of the flex cable relative to actuator comb assembly.

System 500 is shown to include a component platform 501-1 and an analogous component platform 501-2. Each component platform 501 is configured to statically retain a flex cable and an actuator comb assembly in an embodiment of the present invention. In the present embodiment, each component platform consists, in part, of a static flex cable (FC) carrier 550 and a static comb carrier 570.

In an embodiment of the present invention, static comb carrier 570 is configured with a plurality of aligning shafts, e.g., shaft 571 and shaft 572. In accordance with an embodiment of the present invention, shaft 571 and shaft 572 are configured to have inserted thereon an actuator comb assembly 125 having shaft openings disposed thereon. Shaft opening 171 and shaft opening 172 of actuator comb assembly 125 are configured to slide over shaft 571 and shaft 572, respectively, so as to statically retain actuator comb assembly 125.

In an embodiment of the present invention, static FC carrier 550 is configured to passively retain an inserted flex cable 200. In an embodiment, flex cable 200 may be slid into retainers disposed on carrier 550. In alternative embodiments, passive retention may be provided by, but which is not limited to, spring enabled clips, clamping devices, or any other device for retaining an inserted flex cable 200.

Static FC carrier 550 is shown to include a pivoting mechanism, e.g., hinge 555, enabling rotational orientation of a flex cable 200 inserted in carrier 550 into a mounting position relative to an actuator comb assembly 125 disposed upon carrier 570, as indicated by arrow 560, in an embodiment of the present invention. In an embodiment of the present invention, rotational orientation of static FC carrier 550 is manually performed. In an alternative embodiment, the rotational orientation is automatedly performed.

System 500 of FIG. 5 is also shown to include a fastener driver 559 that is configured to retrieve, insert, and activate a fastener, e.g., fastener 239 of FIGS. 2A-2B, 3 and 4, into and upon actuator comb assembly 125, in an embodiment of the present invention, thus fastening a flex cable 200 to the actuator comb assembly. System 500 further includes a fastener repository, e.g., fastener tray 539. Fastener tray 539 is configured to have accessibly contained therein a plurality of fasteners 239 that are retrievable and insertable by fastener driver 559 in an embodiment of the present invention.

System 500 of FIG. 5 additionally includes an optical imaging device, e.g., camera 509, that is configured to capture images depicting positional alignment of a flex cable 200 and an actuator comb assembly 125 in accordance with embodiments of the present invention.

In an embodiment, camera 509 captures a positional alignment image depicting the alignment of the flex cable 200 relative to the actuator comb assembly 125 subsequent to rotating static FC carrier 550 from an initial placing, as shown on component platform 501-1 and orienting carrier 550 proximal to carrier 570, thus placing flex cable 200 into a mounting position, as shown in component 501-2.

In the present embodiment, camera 509 is further configured to capture a positional alignment image depicting the alignment of the flex cable 200 relative to the actuator comb assembly 125 subsequent to fastener drive 559 retrieving a fastener 239 from fastener tray 539, inserting fastener 239 into opening 139 of actuator comb assembly 125 and activating the fastening properties of fastener 239.

Figure 7:
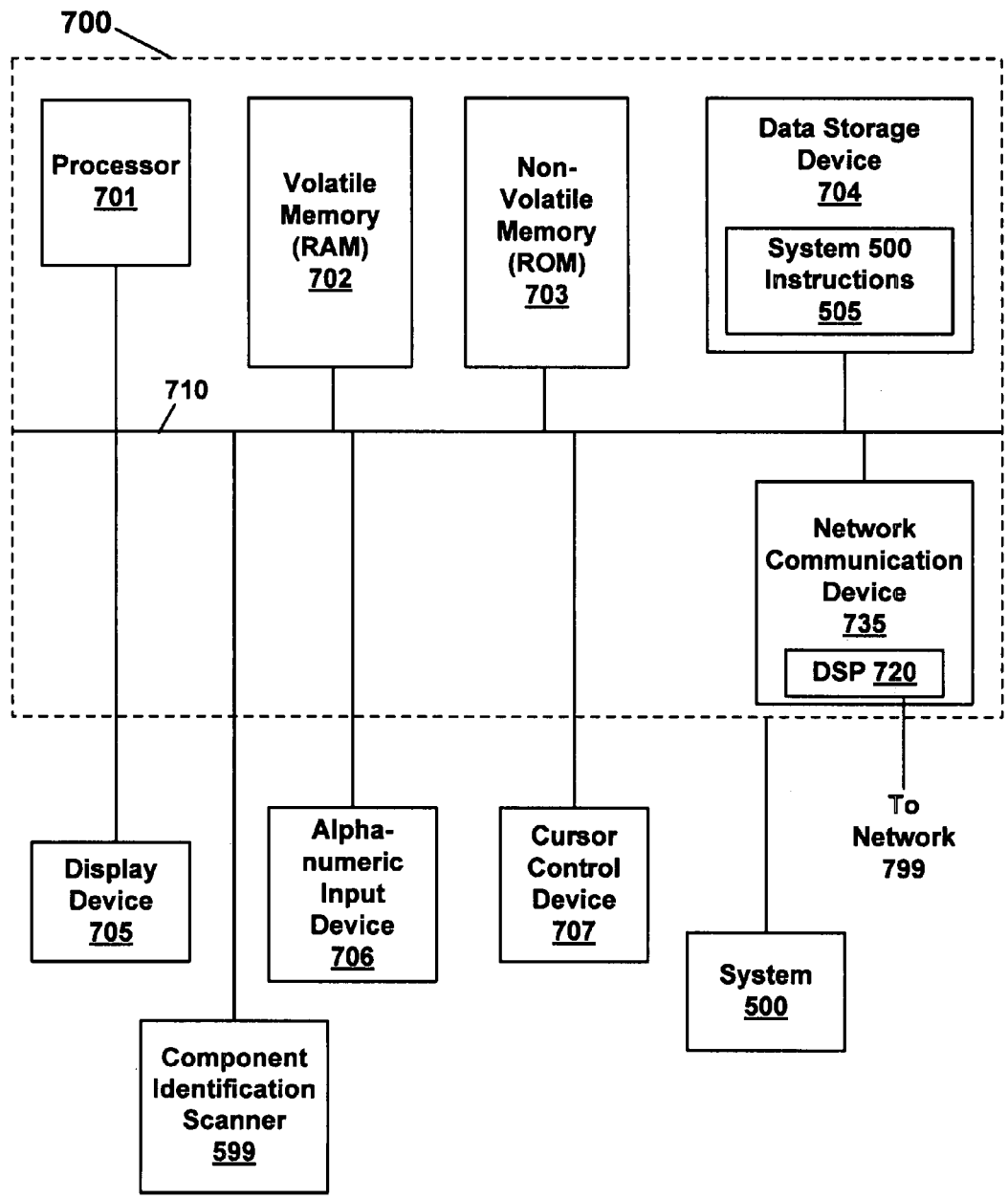
FIG. 7 is a block diagram of a computer system for controlling processes associated with embodiments of the present invention.

A computer system, e.g., system 700 of FIG. 7, utilizes imagery provided by camera 509 to analyze the position alignment of positional opening 259 relative to positional indicator 159 to determine if the positioning of flex cable 200 upon actuator comb assembly 125 is within acceptable tolerances, thus ensuring optimal alignment and positioning of a flex cable and related integrated lead solder pads relative to related integrated lead solder pads of each parallel arm in an actuator comb assembly.

In accordance with an embodiment of the present invention, it is noted that a component platform, e.g., component platform 501-1 or 501-2, further includes a micro adjustment feature (not shown) that enables micro adjustment of the location of positional opening 259 relative to positional indicator 159 when initial placement of flex cable 200 is misaligned with actuator comb assembly 125. In an embodiment of the present invention, component platforms 501-1 and 501-2 are enabled to micro adjust flex cable 200 relative to actuator comb assembly 125. In an alternative embodiment, component platforms 501-1 and 501-2 are enabled to micro adjust actuator comb assembly 125 relative to flex cable 200. In yet another embodiment, component platforms 501-1 and 501-2 are enabled to micro adjust both flex cable 200 and actuator comb assembly 125 relative to the other.

In accordance with embodiments of the present invention, component platforms 501-1 and 501-2, fastener driver 559, fastener repository 539, and optical device 509 are each disposed on a mechanism having one or more axes of positional adjustments. Further, in an embodiment of the present invention, each mechanism having one or more axes of positional adjustment are configured to intersect with one or more other mechanism in system 500.

FIG. 6 is an illustration of a captured image representing the positional alignment of flex cable 200 relative to an actuator comb assembly 125 in the process of mounting flex cable 200 to actuator comb assembly 125 in an embodiment of the present invention. In an embodiment, camera 509 captures an image of the alignment of positional opening 209 of flex cable 200 relative to a positional indicator 159 disposed upon/within actuator comb assembly 125.

In an embodiment of the present invention, the concentric circles representing position indicator 159 and position opening 259 are utilized to determine accuracy of positional alignment of the related components, e.g., flex cable 200 and actuator comb assembly 125. It is noted that by using a distance variation relative to each concentric circle, as defined within instructions 555 of system 700, an average positional alignment is determined, rather than commonly using a point or cross hairs target.

It is noted that in an embodiment of the present invention, positional locator 159 is created and embedded during flex copper layer deposition process during formation of traces present on actuator comb assembly 125. By utilizing the contrast of yellow copper to brown colored polyimide, strong contrasting image intensity can be achieved.

FIG. 7 is a block diagram illustrating an exemplary computer system 700 that can be used in accordance with embodiments of the present invention. It is noted that computer system 700 can be nearly any type of computing system or electronic computing device including, but not limited to, a server computer, a desktop computer, a laptop computer, or other portable electronic device. Within the context of the present invention, certain discussed processes, procedures, and steps are realized as a series of instructions (e.g., a software program) that reside within computer system memory units of computer system 700 and which are executed by a processor(s) of computer system 700, in one embodiment. When executed, the instructions cause computer system 700 to perform specific actions and exhibit specific behavior which is described in detail herein.

Computer system 700 of FIG. 7 comprises an address/data bus 710 for communicating information, one or more central processors 701 coupled to bus 710 for processing information and instructions. Central processor(s) 701 can be a microprocessor or any alternative type of processor. Computer system 700 also includes a computer usable volatile memory 702, e.g., random access memory (RAM), static RAM (SRAM), dynamic RAM (DRAM), synchronous dynamic RAM (SDRAM), double data rate RAM (DDR RAM), etc., coupled to bus 710 for storing information and instructions for processor(s) 701. Computer system 700 further includes a computer usable non-volatile memory 703, e.g., read only memory (ROM), programmable ROM, electronically programmable ROM (EPROM), electrically erasable ROM (EEPROM), flash memory (a type of EEPROM), etc., coupled to bus 710 for storing static information and instructions for processor(s) 701. In an embodiment, non-volatile memory 703 can be removable.

System 700 also includes one or more signal generating and receiving devices, e.g., signal input/output device(s) 735 coupled to bus 710 for enabling computer 700 to interface with other electronic devices via a network, e.g., network 799. Communication interface 735 can include wired and/or wireless communication functionality. For example, in one embodiment, communication interface 735 is an Ethernet adapter, but can alternatively be one of a number of well known communication standards and protocols, e.g., a parallel port, a serial communication port, a FireWire (IEEE 1394) interface, a Universal Serial Bus (USB), a small computer system interface (SCSI), an infrared (IR) communication port, a Bluetooth wireless communication adapter, a broadband connection, and the like. In another embodiment, a digital subscriber line (DSL) can be implemented as signal input/output device 735. In such an instance, communication interface 735 may include a DSL modem. Network 799 may be, but is not limited to, a client/server network, an intranet network, an internet network, or any other network enabling intercommunication between two or more computer systems.

Still referring to FIG. 7, network communication device 735, in an embodiment, includes an optional digital signal processor (DSP) 720 for processing data to be transmitted or data that are received via network communication device 735. Alternatively, processor 701 can perform some or all of the functions performed by DSP 720.

Computer 700 of FIG. 7 can also include one or more computer usable data storage device(s) 704 coupled to bus 110 for storing instructions and information, in one embodiment of the present invention. In one embodiment, data storage device 704 can be a magnetic storage device, e.g., a hard disk drive, a floppy disk drive, a zip drive, or other magnetic storage device. In another embodiment, data storage device 704 can be an optical storage device, e.g., a CD (compact disc), a DVD (digital versatile disc), or other alternative optical storage device. Alternatively, any combination of magnetic, optical, and alternative storage devices can be implemented, e.g., a RAID (random array of independent disks) configuration. It is noted that data storage device 704 can be located internal and/or external of system 700 and communicatively coupled with system 700 utilizing wired and/or wireless communication technology, thereby providing expanded storage and functionality to system 700. It is further noted that nearly any portable electronic device can also be communicatively coupled with system 700 via utilization of wired and/or wireless technology, thereby expanding the functionality of system 700. In an embodiment of the present invention, instructions, specifications, and tolerances related to components used in conjunction with processes performed by a system for mounting and verifying positional orientation of components in a component to component mounting process are stored in storage device 704, e.g., system 500 instructions 505. Although instructions 505 are shown wholly disposed in storage device 704, instructions 505 may alternatively be stored in volatile memory 702, non-volatile memory 703, or in a combination of memory 702, memory 702 and storage device 704.

System 700 can also include one or more optional display devices 705 coupled to bus 710 for displaying video, graphics, and/or alphanumeric characters. It is noted that display device 705 can be a CRT (cathode ray tube), a thin CRT (TCRT), a liquid crystal display (LCD), a plasma display, a field emission display (FED), a television or any other display device or combinations of display devices suitable for displaying video, graphics, and alphanumeric characters recognizable to a user. In an embodiment of the present invention, display device 705 may be a touch screen display device.

Computer system 700 of FIG. 7 further includes an optional alphanumeric input device 706 coupled to bus 710 for communicating information and command selections to processor(s) 701, in one embodiment. Alphanumeric input device 706 is coupled to bus 710 and includes alphanumeric and function keys. Also included in computer 100 is an optional cursor control device 707 coupled to bus 710 for communicating user input information and command selections to processor(s) 701. Cursor control device 707 can be implemented using a number of well known devices such as a mouse, a trackball, a track pad, a joy stick, a optical tracking device, a touch screen, etc. It is noted that a cursor can be directed and/or activated via input from alphanumeric input device 706 using special keys and key sequence commands. It is further noted that directing and/or activating the cursor can be accomplished by alternative means, e.g., voice activated commands, provided computer system 700 is configured with such functionality.

In the present embodiment, system 700 is also to include a component identification scanner 599 for identifying each component subjected to the mounting process in accordance with embodiments of the present invention. Each component, e.g., flex cable 200 and actuator comb assembly 125 may have a unique identifier disposed thereon. Types of unique identifiers can include, but which is not limited to, bar codes, RFID, or other means of uniquely identifying each component. Accordingly, scanner 599 is appropriate for the implemented unique identifier present on a component.

Figure 8:
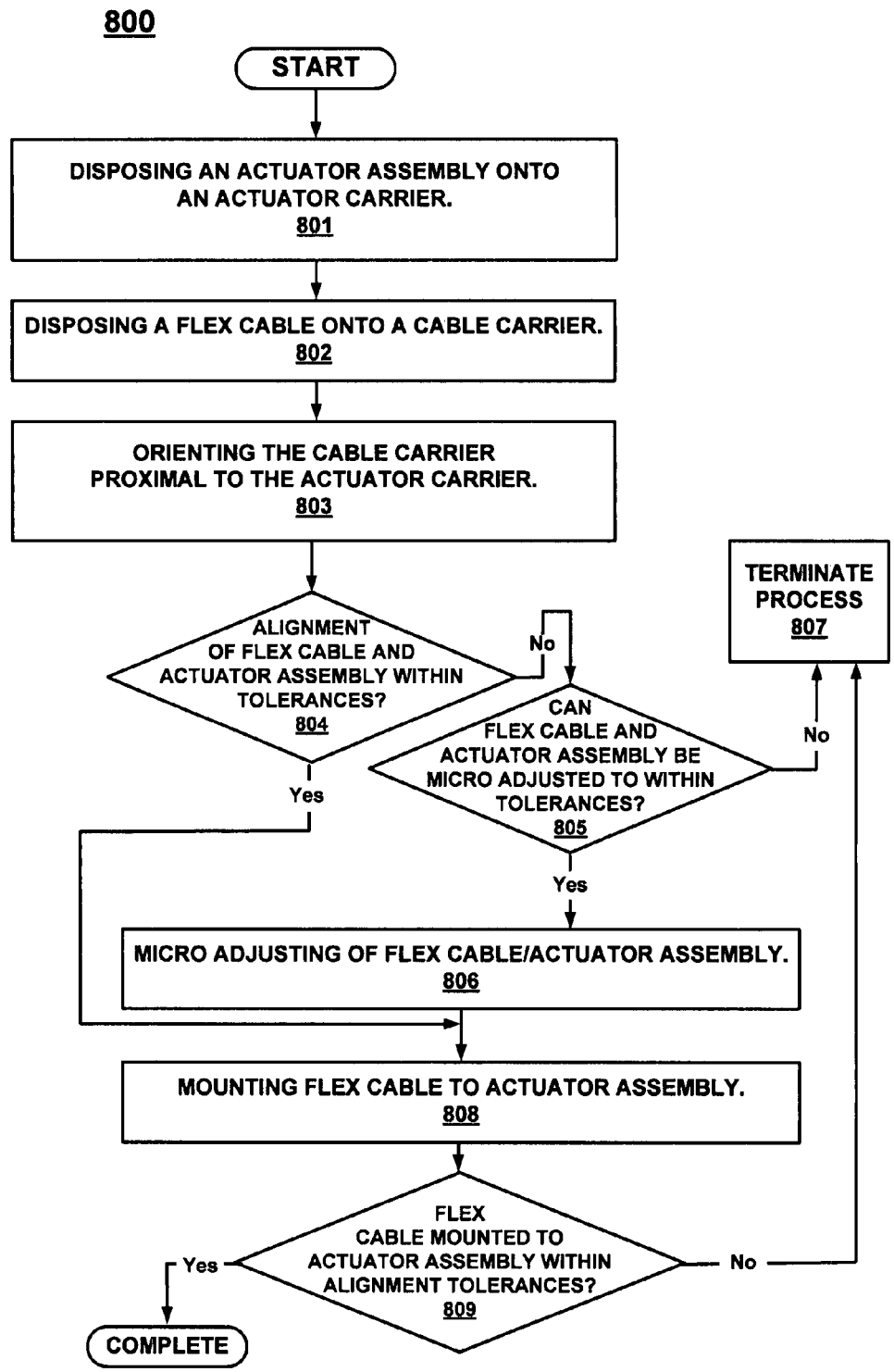
FIG. 8 is a flowchart of a method for positioning a flex cable and actuator comb in accordance with an embodiment of present invention.

FIG. 8 is a flowchart of a process 800 for optically verifying positional alignment of flex cable and an actuator comb assembly during a component to component assembly process performed thereon, in accordance with an embodiment of the present invention. FIG. 8 is a flow chart of a process 800 in which particular steps are performed in accordance with an embodiment of the present invention for component to component mounting. Although specific steps are disclosed in process 800, such steps are exemplary. That is, the present invention is well suited to performing various other steps or variations of the steps recited in FIG. 8. Within the present embodiment, it should be appreciated that the steps of process 800 may be performed by software, by hardware, by an assembly mechanism, through human interaction, or by any combination of software, hardware, assembly mechanism, and human interaction.

Process 800 for positional alignment verification in a component to component mounting process will be described with reference to components and devices shown in FIG. 1, FIGS. 2A-2B and FIGS. 3-7 in accordance with embodiments of the present invention.

In step 801 of process 800, an actuator comb assembly, e.g., assembly 125 of FIGS. 1, 2A-2B, 3 and 4, is placed on a static comb carrier, e.g., static comb carrier 570 of system 500 of FIG. 5, in an embodiment of the present invention. In an embodiment of the present invention, static comb carrier 570 includes a shaft 571 and shaft 572 configured to fit within shaft openings 171 and 172 of actuator comb assembly 125.

In an embodiment of the present invention, an identifier on the actuator comb assembly 125, e.g., a bar code identifier, is scanned, via scanner 599, into system 500 prior to placing the assembly into the carrier. In an embodiment, the assembly identifier is manually scanned. Alternatively, scanning may be performed automatedly. Further, in an embodiment, assembly 125 may be manually placed onto carrier 570. Alternatively, assembly 125 may be automatedly placed onto carrier 570.

In step 802 of process 800 for positional alignment verification in a component to associated component mounting process, a flex cable 200 is placed onto a static flex cable (FC) carrier, e.g., static FC carrier 550 of system 500 of FIG. 5, in an embodiment of the present invention. In an embodiment of the present invention, an identifier on flex cable 200, e.g., a bar code identifier, is scanned, via scanner 599, into system 500 prior to placing the flex cable into the carrier. In an embodiment, the flex cable identifier is manually scanned. Alternatively, scanning may be performed automatedly. Further, in an embodiment, assembly 125 may be manually placed onto carrier 570. Alternatively, assembly 125 may be automatedly placed onto carrier 570.

In step 803 of process 800, flex cable 200 is rotated onto and initially aligned with actuator comb assembly 125, via pivoter 555 of static FC carrier 550 and as indicated by arrow 560 in an embodiment of the present invention. In an embodiment of the present invention, carrier 550 is manually rotated. Alternatively, carrier 550 may be automatedly rotated.

In step 804 of process 800, the alignment of flex cable 200 relative to actuator comb assembly 125 is determined, in an embodiment of the present invention. In an embodiment, an optical device, e.g., camera 509 of system 500 is used to capture an image representing the alignment of a position indicator disposed on actuator comb assembly 125 relative to a position opening disposed within flex cable 200. The captured image is then compared with acceptable alignment tolerances. If the alignment of the position indicator and position opening is within acceptable tolerances, the process proceeds to step 808. If the alignment is not within acceptable tolerances, the process proceeds to step 805.

In step 805, if the alignment is determined to be adjustable to conform within acceptable tolerances, process 800 proceeds to step 806. If the alignment is not within acceptable tolerances and cannot be adjusted, process 800 terminates, e.g., 807.

In step 806, system 500 may cause carrier 550 to micro adjust the position of flex cable 200 relative to actuator comb assembly 125, in an embodiment of the present invention. In another embodiment, system 500 may cause carrier 570 to micro adjust the position of actuator comb assembly 125 relative to flex cable 200. Alternatively, system 500 may cause both carrier 550 and 570 to micro adjust the positions of flex cable 200 and actuator comb assembly 125 in combination. Upon completion of micro adjustments, the process proceeds to step 806.

In step 808, a fastening device, e.g., screw 239 of FIG. 2A, and is retrieved from a fastening device repository, e.g., fastener tray 539 of system 500 of FIG. 5, in an embodiment of the present invention. In an embodiment, fastener driver 559 retrieves fastener 239. Subsequent to the retrieval of a fastening device 239, fastener driver 559 inserts fastener 239 through opening 209 of flex cable 200 and into opening 139 of actuator comb assembly 125. Fastener driver 559 subsequently engages fastener 239 with actuator comb assembly 125, such that flex cable 200 is snugly disposed upon and against actuator comb assembly 125, in an embodiment of the present invention.

In step 809 of process 800, the alignment of flex cable 200 relative to actuator comb assembly 125 subsequent to a mounting process performed thereon is determined, in an embodiment of the present invention. In an embodiment, an optical device, e.g., camera 509 of system 500 is used to capture an image representing the alignment of a position indicator disposed on actuator comb assembly 125 relative to a position opening disposed within flex cable 200 after insertion of retentive device 329. The captured image is then compared with acceptable alignment tolerances. If the alignment of the position indicator and position opening is within acceptable tolerances, the process is complete and process 800 ceases. Alternatively process 800 may return to step 801 to repeat the process. If the alignment is not within acceptable tolerances, the process terminates, e.g., terminate 807.

Embodiments of the present invention, in the various presented embodiments, provide a system and method for optically verifying positional alignment in a component to component mounting process.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for positioning an electrical component relative to an associated electrical component comprising:
   a structure;
   an electrical component receiver, coupled with said structure, and onto which said electrical component is disposed;
   an associated electrical component receiver, coupled with said structure, and onto which said associated electrical component is disposed, wherein said electrical component receiver configured to orient said electrical component into a position for electrical coupling said electrical component to said associated electrical component;
   a fastening device driver coupled with said structure and for inserting a screw, said screw for coupling said electrical component to said associated electrical component in said position and for enabling electrical communication between said electrical component and said associated electrical component; and
   an optical position verifier coupled with said structure and for verifying said position of said electrical component and said associated electrical component.

2. The apparatus as recited in claim 1 wherein said electrical component comprises an alignable opening.

3. The apparatus as recited in claim 1 wherein said associated electrical component comprises a position indicator, wherein said alignable opening and said position indicator are alignable relative to each another.

4. The apparatus as recited in claim 1 wherein said electrical component further comprises:
   an opening through which said screw is inserted.

5. The apparatus as recited in claim 1 wherein said associated electrical component further comprises:
   an another opening and into which said screw is inserted and activated, wherein activation of said screw couples said electrical component and associated electrical component in said position.

6. The apparatus as recited in claim 1 wherein said optical position verifier is configured to cause adjustment of said position of said electrical component relative to said associated electrical component prior to activation of said fastening device driver.

7. The apparatus as recited in claim 6 wherein said optical position verifier utilizes alignment of a position indicator disposed on said associated electrical component and a position opening disposed within said electrical component to cause said adjustment and verification of said position.

* * * * *